United States Patent [19]

Wallace et al.

[11] Patent Number: 4,602,072

[45] Date of Patent: Jul. 22, 1986

[54] COLOR IMPROVEMENT OF POLYMER COMPOUNDS AND PRODUCTS MOLDED THEREFROM

[75] Inventors: Leslie E. Wallace, Midland; Leo F. Rokosz, Linwood; Charles L. Stacy, Jr., Midland, all of Mich.

[73] Assignee: The Dow Chemical Company, Midland, Mich.

[21] Appl. No.: 677,264

[22] Filed: Dec. 3, 1984

[51] Int. Cl.$^4$ ................................................ C08F 2/00
[52] U.S. Cl. .................................................. 526/77
[58] Field of Search ........................................ 526/77

[56] References Cited

U.S. PATENT DOCUMENTS

| | | | |
|---|---|---|---|
| 2,230,274 | 2/1941 | Soday | 526/77 X |
| 2,444,589 | 7/1948 | Blann | 260/465.6 |
| 2,555,798 | 6/1951 | Kropa | 526/77 X |
| 3,812,088 | 5/1974 | Bennett | 526/77 X |
| 4,061,858 | 12/1977 | Wild et al. | 526/77 X |
| 4,068,053 | 1/1978 | Miserlis et al. | 526/77 X |
| 4,243,781 | 1/1981 | Kent, Jr. | 526/77 X |

OTHER PUBLICATIONS

Chemical Engineers' Handbook, Perry et al., 1973 pp. 16-2 to 16-5.

*Primary Examiner*—Paul R. Michl
*Attorney, Agent, or Firm*—Price, Heneveld, Huizenga & Cooper

[57] ABSTRACT

The specification discloses a method for improving color purity in polymers by passing the monomer stream first through an alkali metal aluminosilicate molecular sieve and then through an activated alumina bed prior to polymerization.

17 Claims, 1 Drawing Figure

COLOR IMPROVEMENT OF POLYMER COMPOUNDS AND PRODUCTS MOLDED THEREFROM

BACKGROUND OF THE INVENTION

The present invention relates to color improvement of polymer compounds and products molded from those polymer compounds.

The color problem which is addressed by the present invention becomes particularly noticeable in products molded from particular polymers. For example, styrene-acrylonitrile is referred to as "yellow polystyrene," because it has many of the desirable characteristics of polystyrene, but tends to yellow when it is molded. This coloring problem is aggravated as the polymer resin ages.

Some manufacturers attempt to avoid this problem by using less acrylonitrile in their polymers. For example, one major manufacturer offers a styrene-acrylonitrile with only 23% acrylonitrile rather than the 25% offered by other manufacturers.

Deoxygenation has been demonstrated to improve color in some polymers. Deoxygenation is performed on the monomer stream, on the resin, or both. To deoxygenate the monomer stream, the monomer is sprayed into a vacuum chamber prior to polymerization. To deoxygenate the polymer resin, the resin is placed in a vacuum chamber to remove imbibed oxygen.

These deoxygenation techniques were unsuccessfully employed in an attempt to improve the color of styrene-acrylonitrile molded products. Any color improvement was extremely slight.

SUMMARY OF THE INVENTION

The present invention is based on the serendipitous discovery that the color in polymer resins, and especially resins incorporating acrylonitrile, e.g., styrene-acrylonitrile, and the color in products molded therefrom, can be improved significantly by passing the monomer stream first through an aluminosilicate molecular sieve bed and then through an activated alumina bed prior to polymerization. For example, in all color tests performed on test samples of styrene-acrylonitrile, where the monomer streams had been so treated, the color purity was, on balance, actually slightly better than the color purity of polystyrene.

This discovery was made during the course of experiments designed to eliminate gel streaking in vinyl polymers, and especially styrene-acrylonitrile. While the use of the above invention did not eliminate gel streaking, the specific combination of the aluminosilicate sieve and the activated alumina bed did afford surprising color improvement in products molded from the resulting polymer resin.

DESCRIPTION OF THE PREFERRED EMBODIMENTS

Figure 1:
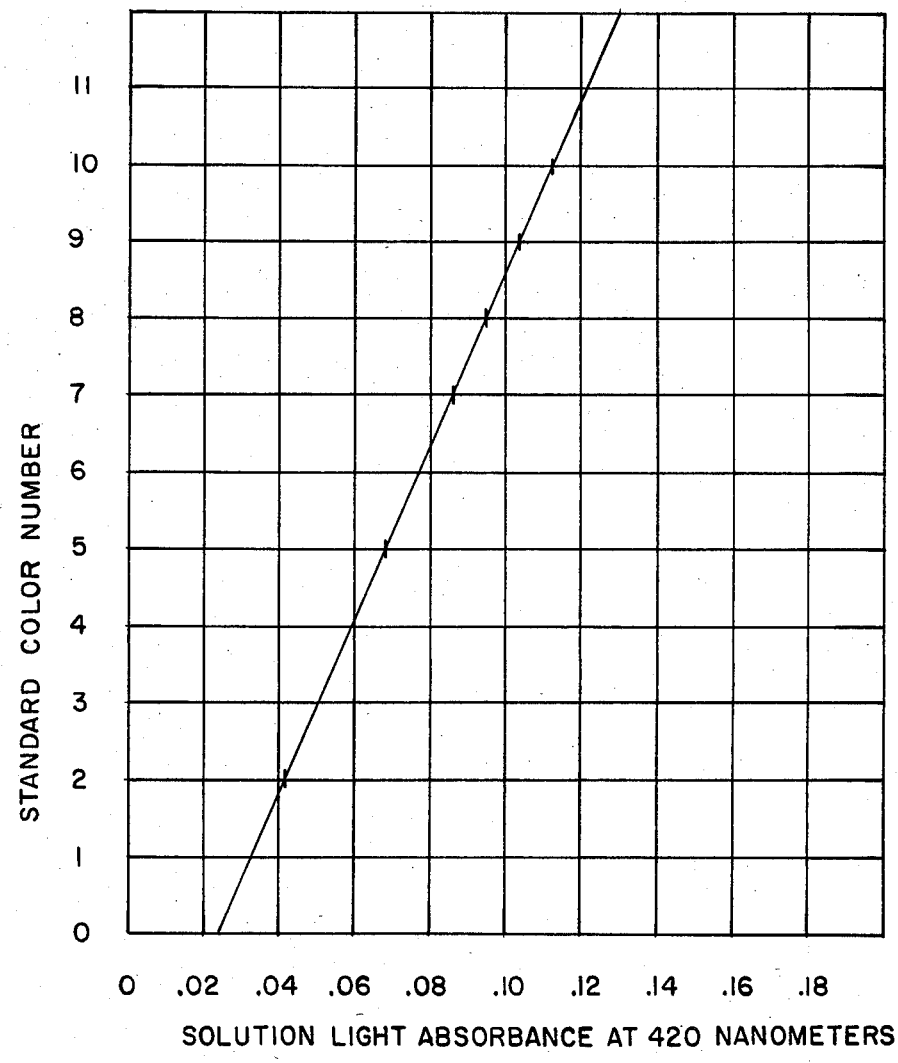
FIG. 1 is a plot of standard color numbers against solution light absorbance at 420 nanometers, used to measure color impurities in molded styrene-acrylonitrile test samples made in accordance with the present invention.

Because the problem of molded product coloring is particularly acute in styrene-acrylonitrile, the preferred embodiment of the invention will be described in the context of styrene-acrylonitrile production. In the preferred embodiment, the acrylonitrile and styrene monomers are passed, either as separate streams or a common stream, twice through an activated alkali metal aluminosilicate molecular sieve bed and then once through an activated alumina bed. The purified monomers are then polymerized, devolatilized and pelletized in a conventional manner.

The alkali metal aluminosilicate molecular sieve should have a partical size of from about 1/32 inch to about 3/32 inch average diameter. It should have an equilibrium water capacity of at least about 20% by weight measured at 17.5 millimeters of mercury and 25 degrees C.

The nominal pore diameter should be relatively small, e.g., about 3 angstroms. The sieve will thus trap relatively small molecular impurities including water, while allowing the larger styrene and acrylonitrile monomer molecules to pass without being absorbed.

The chemical formula for the alkali metal aluminosilicate is as follows:

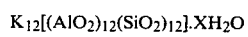

$$K_{12}[(AlO_2)_{12}(SiO_2)_{12}] \cdot XH_2O$$

where K is an alkali metal atom. It has been found that the Linde Molecular Sieve Type 3A is well suited to practice of the present invention. This product is available from Union Carbide Corporation.

The activated alumina should have a particle size falling between about 14 to about 28 Tyler Mesh screen size. It should absorb 14%-16% of its dry weight in moisture at 60% relative humidity. The surface area of the alumina used was about 210 square meters per gram.

It has been found that activated alumina "F-1" is operable in the practice of the present invention. It comprises about 92% aluminum oxide ($Al_2O_3$), 0.90% sodium oxide ($Na_2O$), 0.08% iron oxide ($Fe_2O_3$) and 0.09% silicone oxide ($SiO_2$).

The molecular sieve and the activated alumina bed should be dried and purified prior to use. This is done by drying in an evacuated dryer, such as for example a Beringer Jet Cleaner, at elevated temperatures, i.e., approximately 700 degrees F. (370 degrees C.).

The bed materials are supported in a column on glass wool or on a screen such as a 100 mesh stainless steel screen. The monomer stream is passed through the column under pressure and at a slightly elevated temperature from one end to the other. The limiting factor on bed temperature is of course the polymerization initiation temperature.

MINI-PLANT OPERATION

In a mini-plant operation, approximately 700 cc by volume of each purified bed material was placed in a grass burette and supported on a glass wool or 100 mesh stainless steel screen base. The monomer stream was passed through each bed under pressure, for example approximately 300 psi, and at slightly elevated temperatures, for example about 50 degrees C. The stream is passed at least once through each bed, and preferably twice through the alkali metal aluminosilicate molecular sieve. The monomer stream can be passed through the beds in series, i.e., each individual monomer separately, or in combination, the monomers already being mixed. The limiting factor in this regard is of course the reactability of the particular monomers involved.

The rate of treatment of the monomers is dependent of the capacity of removal of the bed. For example, high contaminate loadings may require larger beds or multiple passes through beds, as for example the double pass through the molecular sieve bed.

After passing through each bed, the monomer stream is passed through a five micron filter to remove friables which may break off the bed particles and enter the monomer stream.

In the mini-plant experiments, the treated monomer stream was made into a 60 pound feed batch with ethylbenzene, to wit 12% ethylbenzene and 88% of a mixture comprising 75% styrene and 25% acrylonitrile. This feed stock was loaded into a nitrogen blanketed feed tank and fed into a mini-coil polymerizer. It was polymerized on a continuous feed basis, devolatilized and then pelletized in a conventional manner.

A number of resin samples were manufactured in accordance with this mini-plant operation and were then molded into test samples. For some of the samples, the monomer stream was passed only once through each bed while for others, the monomer stream was passed twice through the aluminosilicate bed and once through the activated alumina bed.

COLOR ANALYSIS

The color impurities encountered in molded styrene-acrylonitrile products is yellow. The yellowness in samples molded from the experimental styrene-acrylonitrile and from control polymers, was determined by preparing a solution of molded polymer and measuring the absorbance of light at a wave length of 420 nanometers. The measured color level was given an arbitrary standard number by comparing to the absorption at 420 nanometers of a series of color standard solutions rated at increasing numbers for increasing colors (see FIG. 1).

The color standard solutions were prepared by solvating 10 grams of molded polystyrene in 50 cc of methylene chloride and then adding measured amounts of yellow dye. Specifically, two yellow dyes are used, one being Permanza Yellow (-h-pyrazol-4-(2-chlorophenyl-)azo)-3-methyl-1-phenyl), the other being Amaplast Orange LFP from National Aniline, (an anthraquinone dye of undisclosed composition). Each standard sample so prepared was put into a 10 centimeter cell and degassed. Its absorbance was then measured at 420 nanometers. A standard color number was assigned to each solution and plotted (on the ordinate) against absorption at 420 nanometers (on the axis). The resulting graph is presented in FIG. 1.

Molded polymer samples, using polymers purified in accordance with the present invention, and using control polymers, were dissolved and measured in the same way as the color standard samples. Ten grams of molded sample were solvated in 50 cc methylene chloride, placed in 10 centimeter cells and degassed. The absorption measured at 420 nanometers was then extended to the graph of FIG. 1 to determine the standard color number for the molded polymer test sample. The controls included a molded polystyrene sample and a molded styrene-acrylonitrile sample made from a styrene-acrylonitrile resin not purified in accordance with this invention. The test results are summarized in Table I below:

| Test Sample | Abs. at 420 nm | Standard Purification Color # | Sieve | Alumina |
|---|---|---|---|---|
| Pref Emb Sample 1 | 0.050 | 2.75 | 1 Pass | 1 Pass |
| Pref Emb Sample 2 | 0.065 | 4.5 | 1 Pass | 1 Pass |
| Pref Emb Sample 3 | 0.039 | 1.5 | 2 Pass | 1 Pass |
| Pref Emb Sample 4 | 0.040 | 1.6 | 2 Pass | 1 Pass |
| Pref Emb Sample 5 | 0.025 | 0 | 2 Pass | 1 Pass |
| Pref Emb Sample 6 | 0.032 | 0.7 | 2 Pass | 1 Pass |
| Commercial Polystyrene | 0.055 | 3.4 | — | — |
| Commercial Styrene-acrylonitrile | 0.088 | 7 | — | — |

The above test samples show that in all cases except one, samples molded from styrene-acrylonitrile made in accordance with the present invention show less yellow coloring than samples molded from commercially available polystyrene. Where the monomer stream had been passed twice through the alkali metal aluminosilicate molecular sieve, the degree of yellow impurity was always less than that found in the molded polystyrene samples. Of course in all cases, the yellow occurring in the samples molded from preferred embodiment styrene-acrylonitrile was substantially less than that of the sample molded from commercially available styrene-acrylonitrile.

The present invention enables styrene-acrylonitrile to compete in markets where it is not now a factor. For example, styrene-acrylonitrile is more chemical resistant than polymethacrylate polymers. Color problems have, however, kept styrene-acrylonitrile from being a competitive factor vis-a-vis polymethacrylate.

Of course it is understood that the above is merely a preferred embodiment of the invention and that various changes and alterations can be made without departing from the spirit and broader aspects thereof. The invention has been described in the preferred embodiment in the context of the production of styrene-acrylonitrile. Yellow is the problem color impurity which one obtains when molding styrene-acrylonitrile. In the case of other polymer resins, other color impurities may be encountered and accordingly, the invention is not limited per se to the elimination of yellow color impurities.

The embodiments of the invention in which an exclusive property or privilege is claimed are defined as follows:

1. A method for improving color purity in polymers and products molded therefrom comprising:
   passing the monomer stream first through an alkali metal aluminosilicate molecular sieve bed and then through an activated alumina bed, prior to polymerization.

2. The method of claim 1 in which the aluminosilicate bed comprises:
   particles having a size of from about 1/32 inch average diameter to about 3/32 inch average diameter;
   the alumina bed comprising particles of a size falling between about 14 and about 28 Tyler Mesh sieve particle size.

3. The method of claim 2 in which said aluminosilicate bed particles have a water capacity of at least about 20% by weight at 17.5 millimeters mercury and 25 degrees C. and said aluminosilicate bed particles have a static sorption of at least about 14 to 16% at 60% relative humidity.

4. The method of claim 3 in which said aluminosilicate particles have a nominal pore diameter of about 3 angstroms;
said activated alumina particles having a surface area of about 210 square meters per gram.

5. The method of claim 4 in which the monomer stream treated is that for the production of a vinyl polymer.

6. The method of claim 4 in which the monomer stream treated is that for the product of an acrylonitrile copolymer.

7. The method of claim 4 in which the monomer stream treated is that for the production of an acrylonitrile polymer.

8. The method of claim 4 in which the monomer stream treated is that for the production of styrene-acrylonitrile copolymer.

9. The method of claim 1 in which said aluminosilicate particles have a nominal pore diameter of about 3 angstroms;
said activated alumina particles having a surface area of about 210 square meters per gram.

10. The method of claim 9 in which the monomer stream treated is that for the production of a vinyl polymer.

11. The method of claim 9 in which the monomer stream treated is that for the production of an acrylonitrile copolymer.

12. The method of claim 9 in which the monomer stream treated is that for the production of an acrylonitrile polymer.

13. The method of claim 9 in which the monomer stream treated is that for the production of styrene-acrylonitrile copolymer.

14. The method of claim 1 in which the monomer stream treated is that for the production of a vinyl polymer.

15. The method of claim 1 in which the monomer stream treated is that for the production of an acrylonitrile copolymer.

16. The method of claim 1 in which the monomer stream treated is that for the production of an acrylonitrile polymer.

17. The method of claim 1 in which the monomer stream treated is that for the production of styrene-acrylonitrile copolymer.

* * * * *